(12) United States Patent
Verma et al.

(10) Patent No.: US 6,931,351 B2
(45) Date of Patent: Aug. 16, 2005

(54) DECISION MAKING IN CLASSIFICATION PROBLEMS

(75) Inventors: Ashish Verma, New Delhi (IN); Abhinanda Sarkar, New Delhi (IN); Arpita Ghosh, Mumbai (IN)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 09/839,097

(22) Filed: Apr. 20, 2001

(65) Prior Publication Data

US 2002/0174086 A1 Nov. 21, 2002

(51) Int. Cl.$^7$ .............................................. G10L 15/08
(52) U.S. Cl. ...................... 702/182; 702/127; 702/181; 702/189; 702/190; 704/231; 704/246; 704/251; 382/224
(58) Field of Search ............................. 702/57, 81, 84, 702/127, 179–182, 189, 190; 704/231, 246–7, 251, 252, 255–257; 382/224–228

(56) References Cited

U.S. PATENT DOCUMENTS

| | | | | |
|---|---|---|---|---|
| 3,643,215 A | * | 2/1972 | Ingham et al. ............... | 382/199 |
| 5,469,216 A | * | 11/1995 | Takahashi et al. .......... | 348/441 |
| 5,708,693 A | * | 1/1998 | Aach et al. .................. | 378/62 |
| 5,768,420 A | * | 6/1998 | Brown et al. ............... | 382/203 |
| 5,880,767 A | * | 3/1999 | Liu ............................. | 347/251 |
| 6,122,016 A | * | 9/2000 | De Haan et al. ............ | 348/620 |
| 6,219,639 B1 | * | 4/2001 | Bakis et al. ................. | 704/246 |
| 6,243,493 B1 | * | 6/2001 | Brown et al. ............... | 382/186 |
| 6,285,785 B1 | * | 9/2001 | Bellegarda et al. ......... | 382/187 |
| 6,370,505 B1 | * | 4/2002 | Odell .......................... | 704/256 |
| 6,421,640 B1 | * | 7/2002 | Dolfing et al. .............. | 704/236 |
| 6,493,667 B1 | * | 12/2002 | de Souza et al. ........... | 704/240 |
| 6,532,305 B1 | * | 3/2003 | Hammen .................... | 382/227 |
| 6,539,353 B1 | * | 3/2003 | Jiang et al. ................. | 704/254 |
| 6,633,844 B1 | * | 10/2003 | Verma et al. ............... | 704/251 |
| 2001/0043140 A1 | * | 11/2001 | Ross .......................... | 340/5.86 |
| 2002/0010691 A1 | * | 1/2002 | Chen ........................... | 706/20 |
| 2002/0152069 A1 | * | 10/2002 | Gao et al. ................... | 704/240 |
| 2002/0156793 A1 | * | 10/2002 | Jaro ............................ | 707/101 |

OTHER PUBLICATIONS

Potanianos et al., "A cascade visual front end for speaker independent automatic speechreading", Int. J. Speech Technology, Mar., 2001.*

Verma et al., "Late Integration in Audio–Visual Continuous Speech Recognition", ASRU, Colorado, 1999.*

Choudhury et al., "Multimodal Person Recognition using Unconstrained Audio and Video", International Conference on Audio and Video–Based Biometric Person Authentication, AVBPA, 1999. 6 pages.*

Meguro et al., "Adaptive Weighted Median Filters by Using Fuzzy Techniques," 1996 International Symposium on ISCAS, vol.: 2, pp. 9–12. May 1996.*

Taguchi et al., "Adaptive L–filters Based on Fuzzy Rules," 1995 IEEE International Symposium on ISCAS, vol.: 2, pp. 961–964. May 1995.*

* cited by examiner

Primary Examiner—Marc S. Hoff
Assistant Examiner—Jeffrey R West
(74) Attorney, Agent, or Firm—McGinn & Gibb, PLLC; T. Rao Coca, Esq.

(57) ABSTRACT

A method of classifying samples to one of a number of predetermined classes involves using a number of class models or classifiers to form order statistic for each classifier. A linear combination of the order statistic (L-statistic) is calculated to determine the confidence of that particular classifier, both in general and for that particular sample. Relative weights are then derived from these confidences, and used to calculate a weighted summation across all classifiers for each class of the likelihoods that a sample belongs to that class. The sample is classified in the class which has the associated weighted summation which is greatest in value.

17 Claims, 3 Drawing Sheets

DECISION MAKING IN CLASSIFICATION PROBLEMS

FIELD OF THE INVENTION

The invention relates to decision making in classification problems and relates particularly, though not exclusively, to improved methods of classification in decision fusion applications.

BACKGROUND OF THE INVENTION

Decision fusion is a widely used technique for several kinds of classification applications such as, for example, medical imaging, biometric verification, signature or fingerprint recognition, robot vision, speech recognition, image retrieval, expert systems etc.

Generally, in decision fusion applications, multiple classifiers (or experts) perform separate classification experiments on respective data sets, and consequently designate a nominated class as correct. The classifier decisions are then combined in a predetermined selection strategy to arrive at the final class, as described below. Two extreme approaches for the combination strategy are outlined below:
1. The first approach may accept the decision of the majority of the classifiers as the final decision (decision consensus approach).
2. The second approach can take the decision of the most competent expert as the final decision (most competent expert approach).

An intermediate approach involves determining a solution in which a consensus decision is evaluated in terms of the past track records of the experts. Instead of directly accepting the consensus decision, the reliability of each decision is evaluated through various kinds of confidence measures. The decision is either accepted or rejected based on the result of such an evaluation.

In a further approach, a Bayesian cost function is minimized over all the decisions given by the experts. The cost function is defined as the cost of making a wrong decision multiplied by the joint probability of occurrence of the respective decisions.

None of the above approaches outlined above are rigorously optimal or universally applicable, and can be subject to errors or limitations of one kind or another. Accordingly, it is an object of the invention to at least attempt to address these and other limitations associated with the prior art. In particular, it is an object of the invention to generally improve the classification accuracy of particular decision fusion applications which rely on one of the prior art approaches outlined above.

SUMMARY OF THE INVENTION

The invention concept is founded in the recognition that the reliability of a classifier in a decision fusion application can vary from sample to sample and from experiment to experiment. The invention concept involves using the decisions from multiple classifiers in a decision fusion application to make an informed decision as to the classifier which is likely to be correct.

More particularly, the invention concept resides in recognition that a strategy of assigning confidences to different classifiers in a decision fusion architecture can be used to improve the classification accuracy of a decision fusion application. This inventive strategy results in improved classification accuracy as compared to the case where static confidence measures (or weights) for classifiers are used across samples during the experiment or even across the experiments.

Embodiments of the invention involve optimally adapting the weight given to a particular classifier from sample to sample, which generally results in improved performance compared with prior art approaches. A weight or metric of relative confidence is computed for every classifier by determining its sample confidence and overall confidence (as subsequently described). For each class, an overall score (or likelihood) is calculated which combines individual scores from all classifiers, which allows the class with the highest score (or likelihood) to be designated as the correct class.

The invention provides a method suitable for deciding how to classify a sample in one of a number of predetermined classes, the method comprising:

(a) calculating a weight $w_{ij}$ for a classifier i ($1 \leq i \leq \|C\|$) where $\|C\|$ is the cardinality of the set C, which are class models for how to classify a sample j in one of a number of predetermined classes K;

(b) calculating for each of said predetermined classes K, a weighted summation $CL_{jk}$ ($1 \leq k \leq \|K\|$)(given below) across said classifiers of the likelihood $I_{ijk}$ that the sample j belongs to class k as given by classifier i, weighted by the weight $w_{ij}$. Here $\|K\|$ is the cardinality of the set of classes C;

$$CL_{jk} = \sum_{i=1}^{C} w_{ij} * l_{ijk}$$

and (c) designating the sample j as belonging to the class k for which $CL_{jk}$ is greatest in value.

The invention further provides an apparatus for determining the weight $w_{ij}$ for classifier i and sample j. The weight can be derived from a metric of relative confidence in the decision of the respective classifier i. Preferably, this is an L-statistic (linear combination of the order statistic), which represents the statistical separation among the order statistic, preferably log-likelihoods, against the class models for the classifier.

This determination of relative confidence is performed by two different methods to calculate two components of the weight, referred to as sample confidence $L_{ij}$ and overall confidence $H_i$. These confidence values of the classifier i are subsequently used to combine the decisions from all the classifiers i to obtain the final decision.

The L-statistic, for a particular sample j, $L_{ij}$, can be defined as:

$$L_{ij} = a_1 l'_{ij1} + a_2 l'_{ij2} + \ldots + a_K l'_{ijK}$$

where $l'_{ijk}$ denotes for sample j and classifier i, the log-likelihood of the kth most likely class such that the $l'_{ijk}$s form an order statistic, that is $l'_{ij1} > l'_{ij2} > \ldots > l'_{ijK}$. The values of $a_k$ ($1 <= k <= \|K\|$) define the form of the particular L-statistic $L_{ij}$ chosen. Preferably, the order statistic used is simply the difference between the log-likelihoods of the two most likely classes k. That is, $a_1 = 1$, $a_2 = -1$ and all other values of $a_K = 0$.

A cumulative mean Hi of the sample confidences $L_{ij}$ over a large number of samples is used to measure the overall discrimination capability of the classifier and forms the second component of the weight $w_{ij}$.

$$H_i = \sum_{j=1}^{t} L_{ij}/t$$

It is currently understood that the value of the overall confidence Hi, so calculated converges to a constant value which is well separated for different overall confidence levels.

In the equation directly above t is the number of samples after which the overall confidence value converges to a constant. $H_i$ attempts to model some kind of disturbance or noise which is application specific. Typically, such noise degrades the efficiency of the classifier across all classes. For example, in the case of speech recognition, this may be ambient noise (such as car noise, cocktail party noise) present in the audio channel. There may be, of course, some cases in which the amount of noise present in the classifier varies during the experiment.

For every incoming sample j, sample confidence values $L_{ij}(1 \leq i \leq \|C\|)$ are computed for every classifier i. The overall confidence $H_i$ for the classes C are updated using $L_{ij}$. Preferably, a weight $w_{ij}$ is assigned to each classifier i as a function of the overall confidence $H_i$ and the sample confidence $L_{ij}$. Once weights wig for each classifier are known, each incoming sample j can be classified in a class k by calculating the combined log-likelihood $CL_{jk}$ for each class k, as set out directly below.

$$CL_{jk} = \sum_{i=1}^{C} w_{ij} * l_{ijk}$$

where $w_{ij}=f(L_{ij}, H_i)$.

For the sample j, the class k with the highest calculated combined log-likelihood $CL_{jk}$ is finally chosen as the correct class k for sample j.

The invention also includes a computer program product for performing embodiments of the inventive methods described above.

Embodiments of the invention can be used in various applications in which decision fusion is conventionally used.

DETAILED DESCRIPTION OF EMBODIMENTS AND BEST MODE

An embodiment of the invention is described below in the context of an audiovisual speech recognition application which uses fusion for classification problems. In this context, there are two relevant classifiers: audio and video.

Figure 1:
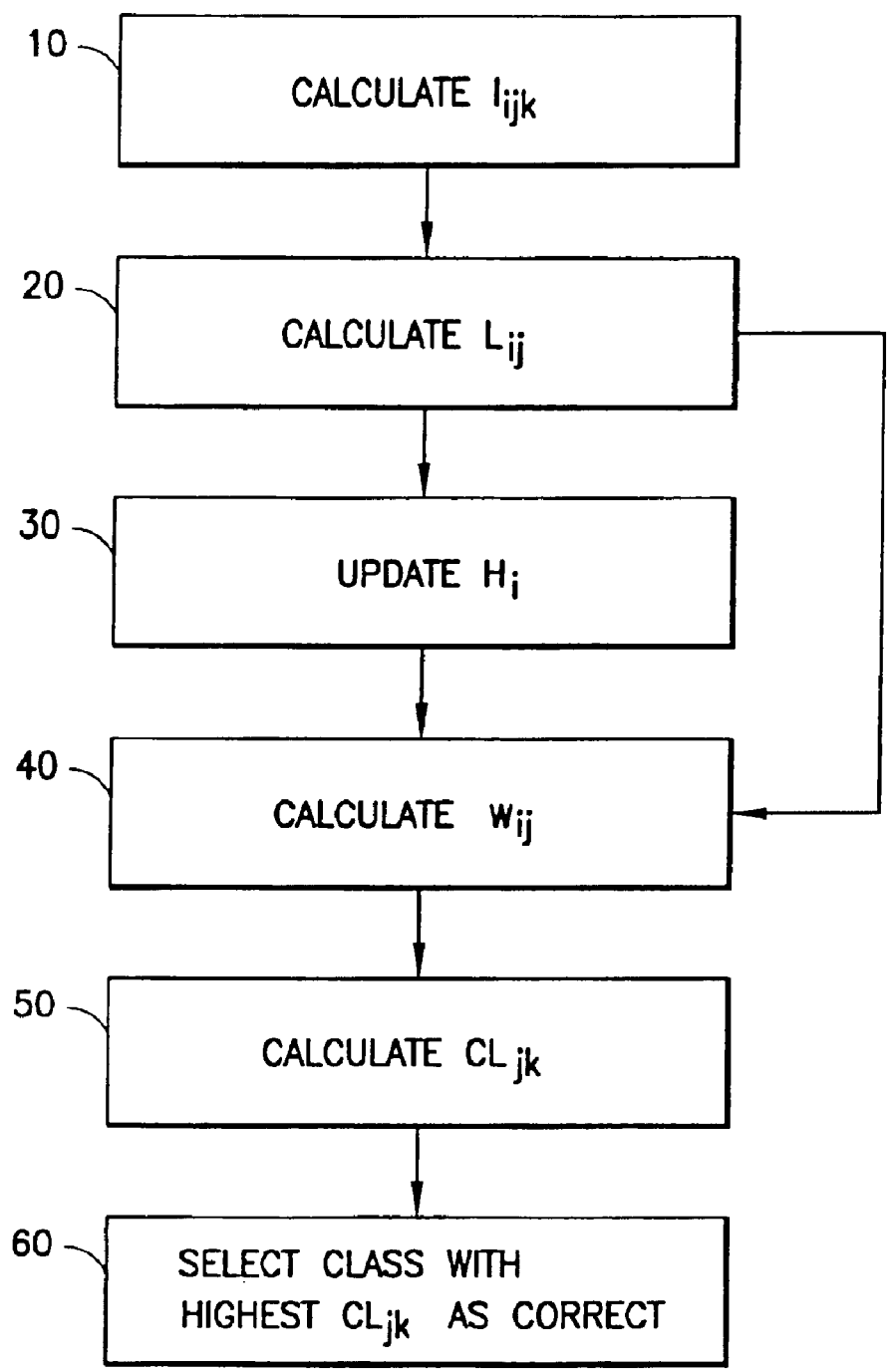
FIG. 1 is a schematic representation of the process involved in reaching a decision in a classification problem, in accordance with an embodiment of the invention.

In overview, the classification or recognition process initially involves steps as outlined in FIG. 1, Initially, in step 10, the process involves calculating a metric of relative confidence for respective classifiers or class models which predict how a sample should be recognized. $L_{ij}$ is calculated in step 20 as an L-statistic of the log-likelihoods $l_{ijk}$, as detailed below. The moving average $H_i$, across a suitable number of samples j is then determined in step 30. This allows weights $w_{ij}$ to be calculated in step 40 for each classifier using $H_i$ and $L_{ij}$, according to a suitable function as detailed below. The combined likelihoods across classifiers $CL_{jk}$ are then calculated in step 50 as a weighted summation of the likelihoods of each class, so that the most likely class can then be determined in step 60.

For the speech recognition application decision, the problem can be defined as follows. Given an audio and a video vector corresponding to a particular speech time frame j, it is necessary to determine the phone class to which this frame belongs. Phones are modeled as GMM (Gaussian Mixture Models) obtained from the training data.

Given an audio vector for speech frame j, its likelihood corresponding lo the phone classes is computed from the respective classification models. From these likelihoods, the L-statistic is preferably chosen simply as the difference between the first and the second most likely choices. As a result, coefficients $a_k$ are used as follows.

$a_1=1$, $a_2=-1$, all other values of $a_k=0$

Figure 2:
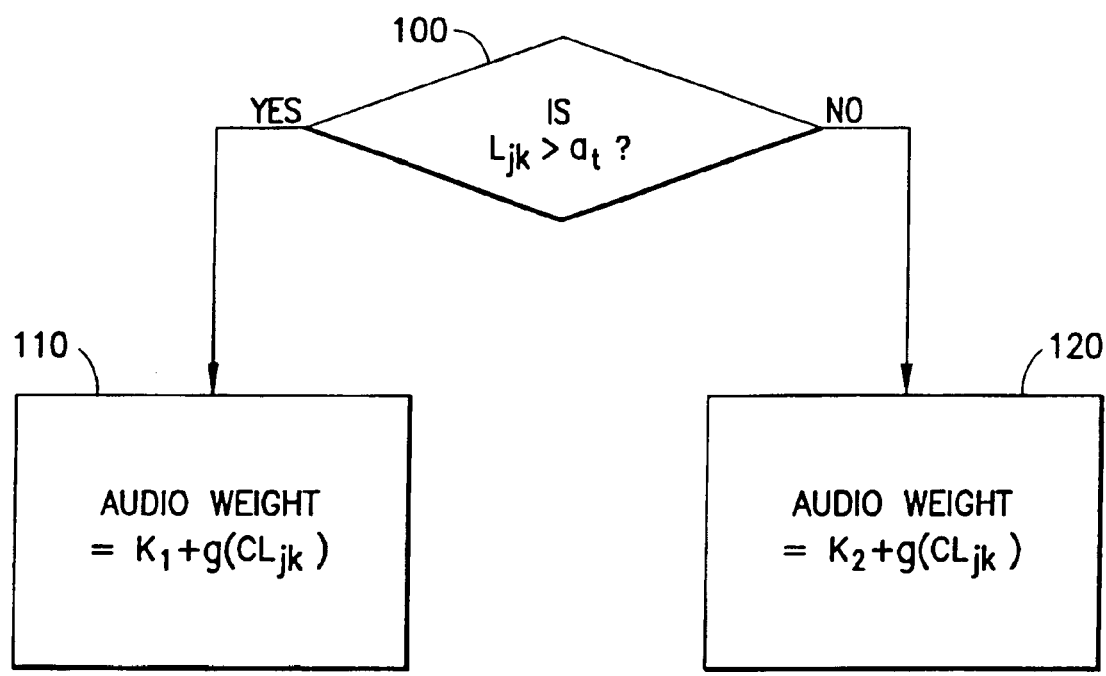
FIG. 2 is a schematic representation of the process involved in determining a weight using a threshold value, in accordance with an embodiment of the invention.

A similar computation is also performed for the video vector. The L-statistic is shown as $L_{ij}$ in FIG. 2. The cumulative mean of L-statistic, $H_i$ is used here to model the background noise present in the audio channel only, as background noise uniformly degrades the audio recognition rate across all phonetic sounds. Accordingly, the L-statistic $L_{ij}$, decreases uniformly in the presence of noise. The combined likelihood corresponding to a particular phone class k, for the speech frame j, is computed as follows.

$$CL_{jk}=w_{aj}*l_{ajk}+w_{vj}*l_{vjk}$$

Here, $l_{ajk}$ and $l_{vjk}$ are log likelihoods for phone class k given by audio and video respectively; and $w_{aj}$ and $w_{vj}$ are the weights assigned to the audio and video classifier respectively for speech frame j. The phone class k with the highest combined likelihood $CL_{jk}$ is selected as the correct phone class.

The weight for audio is determined and, since there are only two classifiers in this case, the weight for video is simply determined as the complement of the weight for audio, as the linear summation of all weights is 1. A threshold $a_1$ is defined for sample confidence values of audio which are just the L-statistic in this case. First, the class confidence value for audio is checked against its threshold in step 100. If it passes this test, audio weight is computed in step 110 as a constant term and a term which is dependent on the overall confidence of the audio channel. If audio fails this test in step 120, the constant term in the weight changes.

Hence this embodiment, function f( ) is implemented as $$w_{ij}=f(L_{ij}, H_i)=f_1(L_{ij})+f_2(H_i)$$

where $f_1( )$ is chosen as a threshold function and $f_2( )$ is given as $$f_2(H_i)=x_1/(1+\exp(x_2*H_i))$$

Parameters $x_1$ and $x_2$ are scalar values that are selected and, if necessary, adjusted to provide good performance. Preferably, sample confidence is used as a confidence measure for a classifier for the current sample being processed. The sample confidence models non-uniform discrimination capability of the classifier across various classes due to the non-uniform dispersion of the clusters in vector space for the data set of the classifier. The sample confidence does not represent the overall discrimination capability of the classifier. A low value of the sample confidence indicates low confidence in its decision for the present sample. Similarly, a high value of the sample confidence indicates a higher confidence in its decision for that sample. The sample confidence for the present sample is preferably represented by the L-statistic for the sample.

Preferably, overall confidence represents the overall discrimination capability of the classifier across all classes (or clusters). This overall discrimination capability may vary between experiments degraded due to the presence of noise which uniformly degrades the classifier's discrimination capability across all classes. For example, in the case of speech recognition, this may be background noise present in the audio channel.

In this application, it is possible to achieve improvements in phonetic classification results using the techniques of the described embodiment of the invention. Computer hardware for performing embodiments of the invention is now described.

Figure 3:
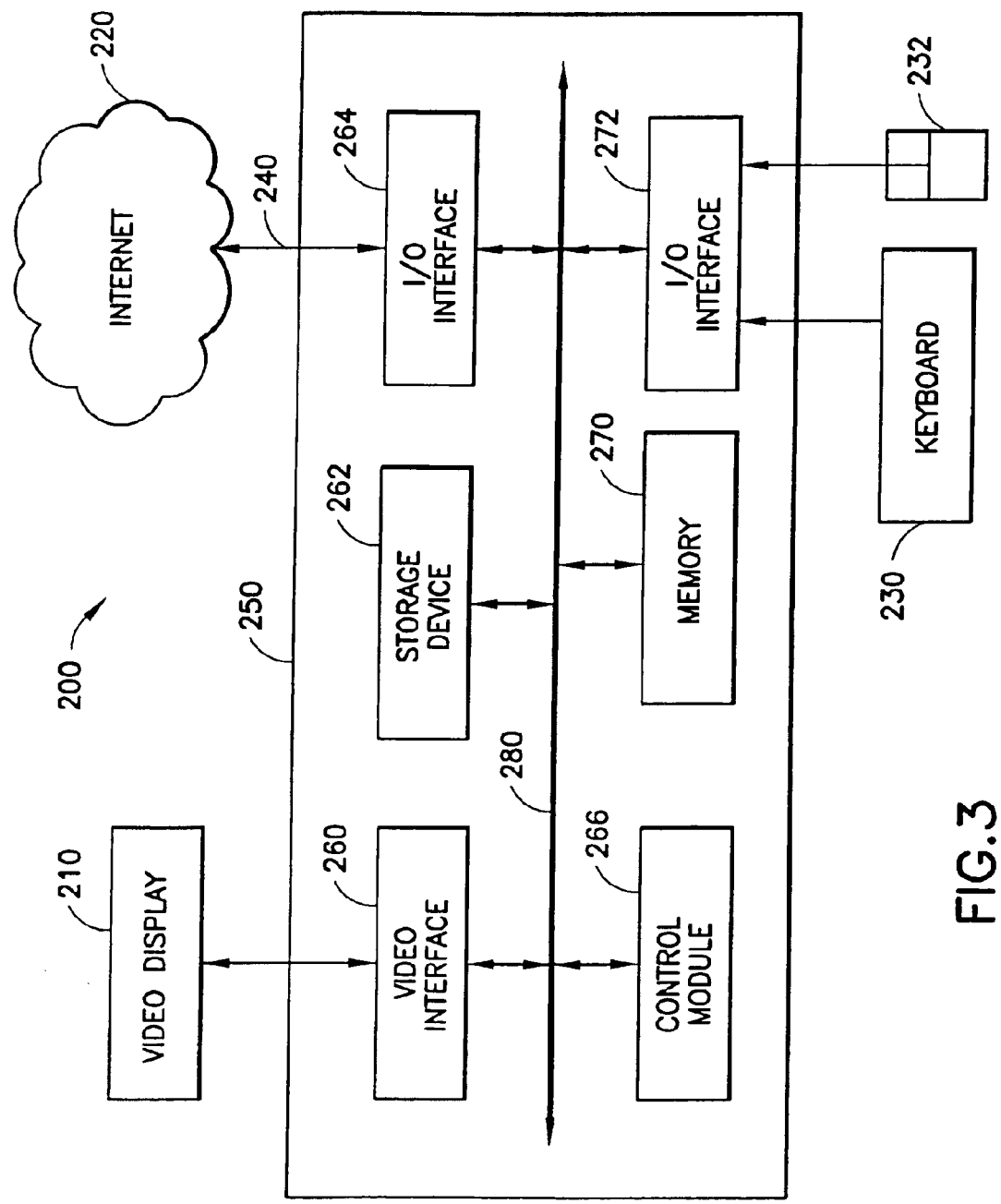
FIG. 3 is a schematic representation of computing hardware suitable for performing embodiments of the invention.

The described process of classification can be implemented using a computer program product in conjunction with a computer system 200 as shown in FIG. 3. In particular, the process can be implemented as software, or computer readable program code, executing on the computer system 200.

The computer system 200 includes a computer 250, a video display 210, and input 10 devices 230, 232. In addition, the computer system 200 can have any of a number of other output devices including line printers, laser printers, plotters, and other reproduction devices connected to the computer 250. The computer system 200 can be connected to one or more other computers via a communication input/output (I/O) interface 264 using an appropriate communication channel 240 such as a modem communications path, an electronic network, or the like, The network may include a local area network (LAN), a wide area network (WAN), an Intranet, and/or the Internet 220.

The computer 250 includes the control module 266, a memory 270 that may include random access memory (RAM) and read only memory (ROM), input/output (I/O) interfaces 264, 272, a video interface 260, and one or more storage devices generally represented by the storage device 262. The control module 266 is implemented using a central processing unit (CPU) that executes or runs a computer readable program code that performs a particular function or related set of functions.

The video interface 260 is connected to the video display 210 and provides video signals from the computer 250 for display on the video display 210. User input to operate the computer 250 can be provided by one or more of the input devices 230, 232 via the I/O interface 272. For example, a user of the computer 250 can use a keyboard as I/O interface 230 and/or a pointing device such as a mouse as I/O interface 232. The keyboard and the mouse provide input to the computer 250. The storage device 262 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 250 is typically connected to other devices via a bus 280 that in turn can consist of data, address, and control buses.

The method steps for are affected by instructions in the software that are carried out by the computer system 200. Again, the software may be implemented as one or more modules for implementing the method steps.

In particular, the software may be stored in a computer readable medium, including 10 the storage device 262 or that is downloaded from a remote location via the interface 264 and communications channel 240 from the Internet 220 or another network location or site. The computer system 200 includes, the computer readable medium having such software or program code recorded such that instructions of the software or the program code can be carried out. The use of the computer system 200 preferably affects advantageous apparatuses for constructing a runtime symbol table for a computer program in accordance with the embodiments of the invention.

The computer system 200 is provided for illustrative purposes and other configurations can be employed without departing from the scope and spirit of the invention. The foregoing is merely an example of the types of computers or computer systems with which the embodiments of the invention may be practiced. Typically, the processes of the embodiments are resident as software or a computer readable program code recorded on a hard disk drive as the computer readable medium, and read and controlled using the control module 266. Intermediate storage of the program code and any data including entities, tickets, and the like may be accomplished using the memory 270, possibly in concert with the storage device 262.

In some instances, the program may be supplied to the user encoded on a CD-ROM or a floppy disk (both generally depicted by the storage device 262), or alternatively could be read by the user from the network via a modem device connected to the computer 250. Still further, the computer system 200 can load the software from other computer readable media. This may include magnetic tape, a ROM or integrated circuit, a magneto-optical disk, a radio or infrared transmission channel between the computer and another device, a computer readable card such as a PCMCIA card, and the Internet 220 and Intranets including email transmissions and information recorded on Internet sites and the like. The foregoing are merely examples of relevant computer readable media. Other computer readable media may be practiced without departing from the scope and spirit of the invention.

Further to the above, the described methods can be realized in a centralized fashion 10 in one computer system 200, or in a distributed fashion where different elements are spread across several interconnected computer systems.

Computer program means or computer program in the present context mean any expression, in any language, code or notation, of a set of instructions intended to cause a system having an information processing capability to perform a particular function either directly or after either or both of the following: a) conversion to another language, code or notation or b) reproduction in a different material form.

In the foregoing manner, a method, an apparatus, and a computer program product for are disclosed. While only a small number of embodiments are described, it will be apparent to those skilled in the art in view of this disclosure that numerous changes and/or modifications can be made without departing from the scope and spirit of the invention.

It is understood that the invention is not limited to the embodiment described, but that various alterations and modifications, as would be apparent to one skilled in the art, are included within the scope of the invention.

We claim:

1. A method for determining a manner of classifying data samples in one of a number of predetermined classes comprising first and second classes, said method comprising:

associating a plurality of data classifiers in a decision fusion application comprising said data samples, wherein said data classifiers indicate a manner of classifying said data sample in said one of a number of fast classes;

computing sample confidence values for each data sample;

determining an overall confidence value for said first classes using said sample confidence values;

assigning a weight value for each of said plurality of data classifiers as a function of said overall confidence value and said sample confidence values;

classifying each said data sample in a second class by calculating a combined log-likelihood value for each second class, wherein said log-likelihood comprises a summation of likelihoods of said plurality of data classifiers weighted by said weight value; and classifying a calculated second class as a correct class for a particular data sample by selecting a particular second class with a highest calculated combined log-likelihood value.

2. The method of claim 1, wherein said sample confidence values comprises a linear combination of an order statistic.

3. The method of claim 2, wherein said linear combination comprises a log-likelihood of respective predetermined classes for said plurality of data classifiers corresponding to said data sample.

4. The mood of claim 2, wherein said plurality of data classifiers comprise audio data classifiers and video data classifiers.

5. The method of claim 3, wherein said sample confidence values comprises said log-likelihood of respective predetermined classes for said plurality of data classifiers corresponding to said data sample, and said overall confidence value comprises a mean of said sample confidence values over a plurality of said data samples.

6. The method of claim 5, wherein said overall confidence value is successively updated with said data sample confidence values of each said data sample.

7. A program storage device readable by computer, tangibly embodying a program of instructions executable by said computer to perform a method for determining a manner of classifying data samples in one of a number of predetermined classes comprising first and second classes, said method comprising:

associating a plurality of data classifiers in a decision fusion application comprising said data samples, wherein said data classifiers indicate a manner of classifying said data sample in said one of a number of first classes;

computing sample confidence values for each data sample;

determining an overall confidence value for said first classes using said sample confidence values;

assigning a weight value for each of said plurality of data classifiers as a function of said overall confidence value and said sample confidence values;

classifying each said data sample in a second class by calculating a combined log-likelihood value for each second class, wherein said log-likelihood comprises a summation of likelihoods of said plurality of data classifiers weighted by said weight value; and classifying calculated second class as a correct class for a particular data sample by selecting a particular second class with a highest calculated combined log-likelihood value.

8. The program storage device of claim 7, wherein said sample confidence values comprises a liner combination of an order statistic.

9. The program storage device of claim 8, wherein said linear combination comprises a log-likelihood of respective predetermined classes for said plurality of data classifiers corresponding to said data sample.

10. The program storage device of claim 8, wherein said plurality of data classifiers comprise audio data classifiers and video data classifiers.

11. The program storage device of claim 9, wherein said sample confidence values comprises said log-likelihood of respective predetermined classes for said plurality of data classifiers corresponding to said data sample, and said overall confidence value comprises a mean of said sample confidence values over a plurality of said data samples.

12. The program storage device of claim 11, wherein said overall confidence value is successively updated with said data sample confidence values of each said data sample.

13. An apparatus for determining a manner of classifying data samples in one of a number of predetermined classes comprising first and second classes, said apparatus comprising:

means for associating a plurality of data classifiers in a decision fusion application comprising said samples, wherein said data classifiers indicate a manner of classifying said data sample in said one of a number of first classes;

means for computing sample confidence values for each data sample;

means for determining an overall confidence value for said first classes using said sample confidence values;

means for assigning a weight value for each of said plurality of data classifiers as a function of said overall confidence value and said sample confidence values;

means for classifying each said data sample in a second class by calculating a combined log-likelihood value for each second class, wherein said log-likelihood comprises a summation of likelihoods of said plurality of data classifiers weighted by said weight value; and means for classifying a calculated second class as a correct class for a particular data sample by selecting a particular second class with a highest calculated combined log-likelihood value.

14. The method of claim 1, wherein said decision fusion application comprises an audiovisual speech recognition application.

15. The method of claim 1, further comprising determining a relative confidence level relating to an accuracy of said plurality of data classifiers for each data sample in said decision fusion application based on said sample confidence values and said overall confidence value.

16. The program storage device of claim 7, wherein said decision fusion application comprises an audiovisual speech recognition application.

17. The program storage device of claim 7, wherein said method further comprises determining a relative confidence level relating to an accuracy of said plurality of data classifiers for each data sample in said decision fusion application based on said sample confidence values and said overall confidence value.

* * * * *